(12) United States Patent
Koyasu et al.

(10) Patent No.: US 6,973,243 B2
(45) Date of Patent: *Dec. 6, 2005

(54) CABLE

(75) Inventors: Osamu Koyasu, Chiba (JP); Kazunaga Kobayashi, Chiba (JP); Satoru Shiobara, Chiba (JP); Ken Osato, Chiba (JP); Masashi Hara, Chiba (JP); Shimei Tanaka, Chiba (JP); Takeshi Honjo, Chiba (JP); Keiji Ohashi, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/765,090

(22) Filed: Jan. 28, 2004

(65) Prior Publication Data

US 2004/0184747 A1    Sep. 23, 2004

(30) Foreign Application Priority Data

Feb. 13, 2003  (JP) ............................ P2003-035037
Feb. 13, 2003  (JP) ............................ P2003-035048

(51) Int. Cl.[7] .............................................. G02B 6/36
(52) U.S. Cl. ...................................... 385/100; 385/105
(58) Field of Search ............................... 385/100, 101, 385/103, 105, 110; 235/488, 492

(56) References Cited

U.S. PATENT DOCUMENTS

| 6,293,081 | B1 * | 9/2001 | Grulick et al. ................. 57/293 |
| 6,478,229 | B1 * | 11/2002 | Epstein ........................ 235/492 |
| 6,648,232 | B1 * | 11/2003 | Emmert ....................... 235/488 |
| 2002/0034365 | A1 | 3/2002 | Vogelsang |
| 2004/0135691 | A1 * | 7/2004 | Duron et al. ............. 340/572.7 |
| 2004/0156601 | A1 * | 8/2004 | Koyasu et al. .............. 385/100 |

FOREIGN PATENT DOCUMENTS

JP        2001-21730 A      2/2001

* cited by examiner

*Primary Examiner*—Chau N. Nguyen
(74) *Attorney, Agent, or Firm*—Sughrue Mion, PLLC

(57) ABSTRACT

A cable wherein even when there is a substantial volume of cable identifying information for identifying the cable, all of that cable identifying information can be simply and speedily written-in. This cable has a cable core, an integrated member with a chain of RFIDs including a plurality of RFID elements arranged at suitable intervals along a longitudinal direction of the cable core, to and from which cable identifying information can be written-in and read-out by transmission of electromagnetic energy, and a transmission coaxial cable for collectively writing-in cable identifying information to all of the RFID elements.

31 Claims, 8 Drawing Sheets

CABLE

CROSS REFERENCE TO RELATED APPLICATIONS

This application claims benefit of priority to Japanese Patent Application No. 2003-35037 and Japanese Patent Application No. 2003-35048 both filed on Feb. 13th, 2003 in the Japanese Patent Office, the entire contents of which are herein incorporated by reference.

BACKGROUND OF THE INVENTION

1. Field of the Invention

This invention relates to a cable, such as an optical fiber cable, metal cable or the like, providing functionality enabling ready identification of the cable, and an integrated member with a chain of RFIDs (Radio Frequency Identification) used for identifying the cable.

2. Description of Relevant Art

Usually, information identifying a cable that enables one cable to be identified from others is associated with the cable sheath (either directly or indirectly). This information enables the particular cable to be identified amongst a plurality of cables laid in, for example, a multi-way conduit or duct when performing work involving the cables such as work to replace an existing cable or remove a cable.

That is to say, information identifying a cable may be printed on the outside surface of a cable sheath using ink or decalcomania paper or marked by a laser, or such cable identifying information can be marked onto a tag applied to the surface of a cable sheath. Furthermore, as disclosed in Japanese Unexamined Patent Application Publication No. 2001-21730, cable identifying information made into a two-dimensional QR (Quick Response) code can be printed on QR code printing paper which can then be adhered to the surface of a cable sheath using a protective film.

In recent years the number of optical fibers or optical fiber ribbons in an optical fiber cable has risen from a low fiber count to a high fiber count, while there has also been an increase in the volume of information that identifies any one cable. Accordingly, it is not easy to apply all of the cable identifying information of a cable simply by printing or marking that information on the surface of a sheath or by applying QR code to the surface of a sheath. Also, such factors make it difficult to identify a particular cable amongst a plurality of cables, which results in a decrease of efficiency in operations performed on the cable.

Moreover, cable identifying information that is printed or marked onto the outside surface of a cable is exposed, so that after a period of time has elapsed since a cable was installed, it may become impossible to decipher the cable identifying information due to wear or the like, making it impossible to identify the cable. Even when QR code printing paper is adhered to the external surface of the sheath of a cable using a protective film, the protective film may peel off from the sheath, resulting in exactly the same problem.

SUMMARY OF THE INVENTION

In order to solve the above-mentioned problems affecting conventional technology, it is an object of this invention to provide a cable to and from which a large volume of cable identifying information can be simply and speedily written-in and read-out.

It is a further object of this invention to provide an integrated member with a chain of RFIDs used for identifying a cable.

In order to realize the above objects, according to one aspect of this invention a cable is provided comprising: a cable core; a plurality of RFID elements arranged in the cable core at suitable intervals along a longitudinal direction of the cable core, to and from which cable identifying information for identifying the cable from other cables can be written in and read out by electromagnetic energy; a transmission coaxial cable disposed in the cable core so as to be superimposed over and coincident with the plurality of RFID elements, this transmission coaxial cable including an inner conductor and an outer conductor arranged coaxially via an insulating layer; and a sheath disposed on the cable core, that covers the outside of the cable core as well as the plurality of RFID elements and the transmission coaxial cable, wherein the outer conductor of the transmission coaxial cable has unshielded opening parts for transferring electromagnetic energy and each RFID element is arranged in proximity to each of the unshielded opening parts.

According to another aspect of this invention a cable is provided comprising: a cable core; an integrated member with a chain of RFIDs disposed in the cable core, this integrated member with a chain of RFIDs including a plurality of RFID elements arranged in the integrated member with a chain of RFIDs at suitable intervals along a longitudinal direction of the cable core, to and from which cable identifying information for identifying the cable from other cables can be written in and read out by electromagnetic energy; a transmission coaxial cable disposed in the cable core so as to be superimposed over and coincident with the integrated member with a chain of RFIDs, this transmission coaxial cable including an inner conductor and an outer conductor arranged coaxially via an insulating layer; and a sheath disposed on the cable core, that covers the outside of the cable core as well as the integrated member with a chain of RFIDs and the transmission coaxial cable, wherein the outer conductor of the transmission coaxial cable has unshielded opening parts for transferring electromagnetic energy and each RFID element is arranged so as to be in proximity to each of the unshielded opening parts.

According to yet another aspect of this invention the integrated member with a chain of RFIDs includes a first joining tape having a first joining face and a second joining tape having a second joining face either adhering to or fused to the first joining face so as to sandwich the plurality of RFID elements between the first joining tape and the second joining tape.

According to yet another aspect of this invention the plurality of RFID elements are arranged at equidistant intervals and the unshielded opening part is formed by applying the outer conductor open helically around the outside of the insulating layer maintaining predetermined intervals.

According to yet another aspect of this invention the plurality of RFID elements are arranged at equidistant intervals and the unshielded opening part is formed of a plurality of slits parts formed in the outer conductor at equidistant intervals along the longitudinal direction of the cable core.

According to yet another aspect of this invention a cable is provided comprising: a cable core; a plurality of RFID elements arranged in the cable core at suitable intervals along a longitudinal direction of the cable, to and from which cable identifying information for identifying the cable from other cables can be written in and read out by transmission of electromagnetic energy; a pair of transmission wires having two conducting wires, this pair of transmission wires being disposed along the direction in which the plurality of RFID elements are arranged in the cable core; and a sheath disposed on the cable core, that covers the outside of the cable core as well as the plurality of RFID elements and the pair of transmission wires, wherein the pair of transmission wires include a plurality of twisted parts formed by the twisting of the two conducting wires and a plurality of loop parts each formed by the two conducting wires and that are either in contact with or in proximity to their respective corresponding RFID elements, and wherein the twisted parts and the loop parts are formed alternately along a longitudinal direction of the cable.

According to yet another aspect of this invention a cable is provided comprising a cable core; an integrated member with a chain of RFIDs disposed on the cable core laid longitudinally or applied open helically around the cable core, this integrated member with a chain of RFIDs including a first joining tape having a first joining face, a second joining tape having a second joining face either adhering to or fused to the first joining face, a plurality of RFID elements arranged between the first joining tape and the second joining tape at suitable intervals along a longitudinal direction of the tapes, to and from which cable identifying information for identifying the cable from other cables can be written in and read out by transmission of electromagnetic energy, and a pair of transmission wires including two conducting wires and that is arranged between the first joining tape and the second joining tape; and a sheath disposed on the cable core, that covers the outside of the cable core as well as the integrated member with a chain of RFIDs, wherein the pair of transmission wires include a plurality of twisted parts formed by the twisting of the two conducting wires and a plurality of loop parts each formed by the two conducting wires and that are in contact with their respective corresponding RFID elements, and wherein the twisted parts and the loop parts are formed alternately along a longitudinal direction of the cable.

According to yet another aspect of this invention an integrated member with a chain of RFIDs used for identifying a cable is provided, this integrated member with a chain of RFIDs comprising: a first joining tape having a first joining face; a second joining tape having a second joining face either adhering to or fused to the first joining face; a plurality of RFID elements arranged between the first joining tape and the second joining tape at suitable intervals in a longitudinal direction of the tapes, to and from which cable identifying information for identifying the cable from other cables can be written in and read out by transmission of electromagnetic energy; and a pair of transmission wires including two conducting wires and that is arranged between the first joining tape and the second joining tape, wherein the pair of transmission wires include a plurality of twisted parts formed by the twisting of the two conducting wires and a plurality of loop parts each formed by the two conducting wires and that are in contact with their respective corresponding RFID elements, and wherein the twisted parts and the loop parts are formed alternately along a longitudinal direction of the tapes.

BRIEF DESCRIPTION OF THE ACCOMPANYING DRAWINGS

These and other objects, features and advantages will become clearer from the following description of exemplary embodiments of the invention, read in connection with the accompanying drawings in which.

DETAILED DESCRIPTION OF THE EXEMPLARY EMBODIMENTS

Figure 1:
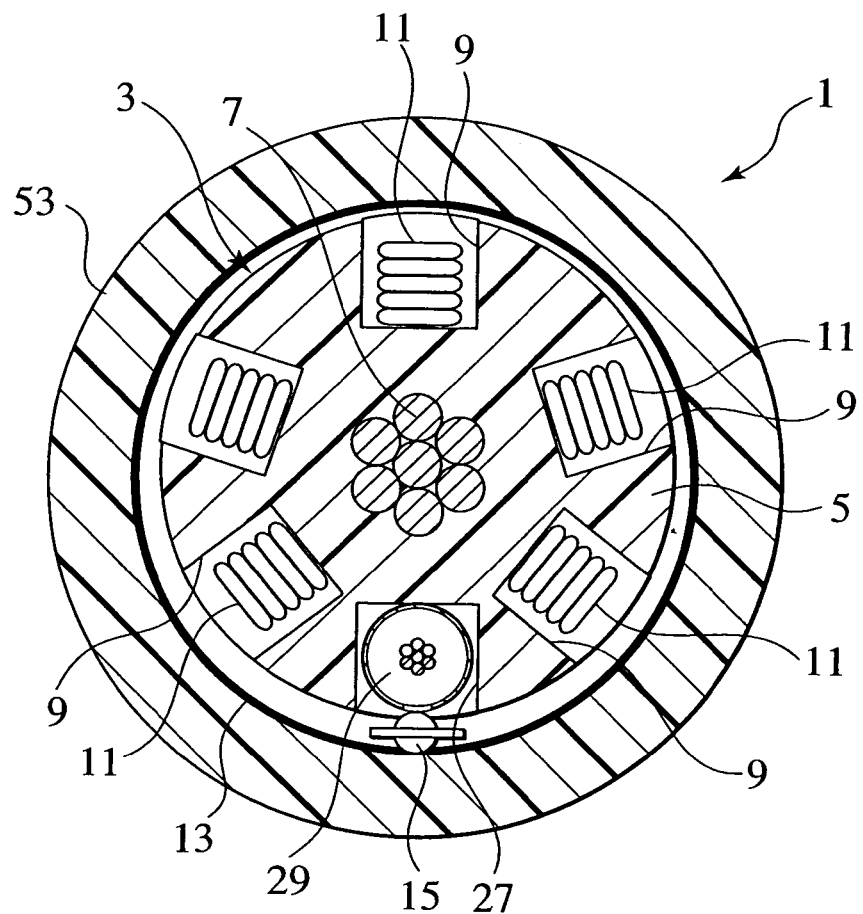
FIG. 1 is a cross-sectional view of an optical fiber cable according to a first exemplary embodiment of this invention.

Exemplary embodiments of this invention will now be described with reference to the drawings. The described exemplary embodiments are intended to assist the understanding of the invention, and are not intended to limit the scope of the invention in any way. The same or similar numbers are used in the drawings to represent the same or similar parts.

FIG. 1 is a cross-sectional view of an optical fiber cable according to a first embodiment of this invention.

As shown in FIG. 1, a cable core 3 forms the major component of an optical fiber cable 1 according to a first embodiment of this invention. More specifically, this cable core 3 includes a slotted core 5 in the center part of which is provided a strength member 7 formed of stranded steel wire. Further, a plurality (according to this embodiment, five) of slots 9 are formed in helical formation around the outside of the slotted core 5. A plurality (according to this embodiment, five) of optical fiber ribbons 11 are accommodated in each of slots 9. Further, a cable core wrap 13 is applied to the outside of the slotted core 5, accommodating the optical fiber ribbons remained inside the slots 9.

An integrated member with a chain of Radio Frequency Identification elements ("RFIDs") 15 for identifying the optical fiber cable 1 is disposed in the cable core 3. This integrated member with a chain of RFIDs 15 will now be described.

Figure 2:
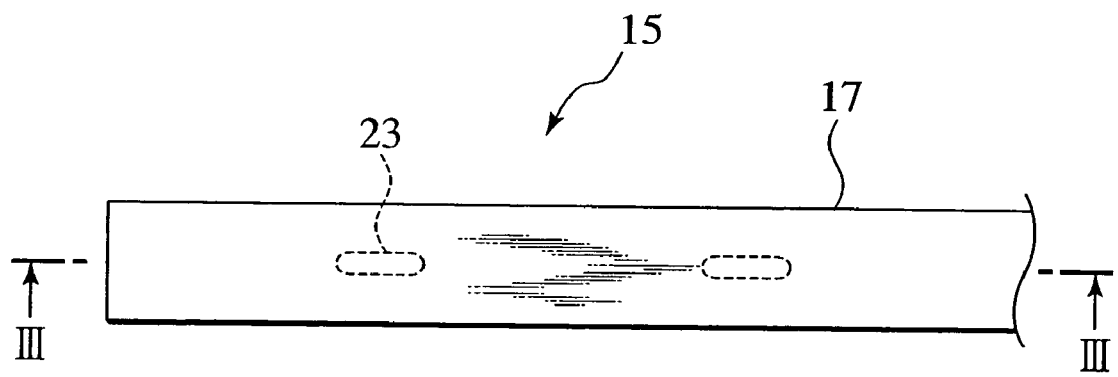
FIG. 2 is a plan view of the integrated member with a chain of RFIDs according to the first exemplary embodiment of this invention.
Figure 3:
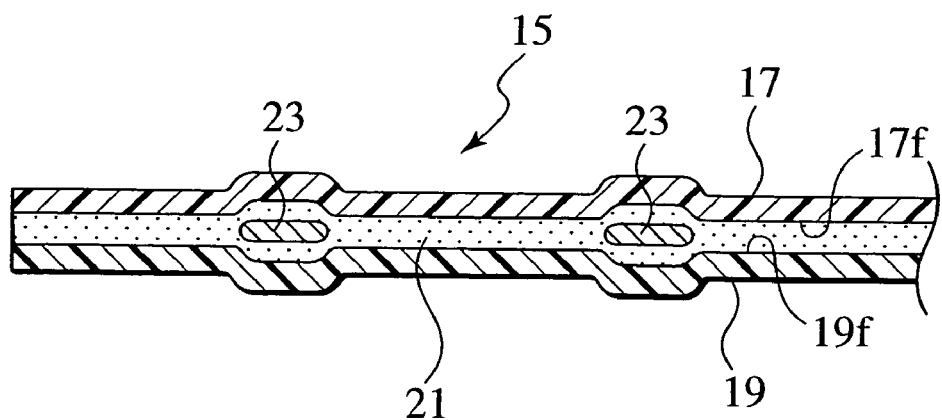
FIG. 3 is a cross-sectional view taken along the line III—III in FIG. 2.

FIG. 2 is a plan view of the integrated member with a chain of RFIDs 15. FIG. 3 is a cross-sectional view of the integrated member with a chain of RFIDs 15 taken along the line III—III in FIG. 2. As shown in FIG. 3, the integrated member with a chain of RFIDs 15 includes a first joining tape 17 and a second joining tape 19, and a plurality of RFID elements 23 sandwiched between the first joining tape 17 and the second joining tape 19. The first joining tape 17 and the second joining tape 19 are adhered to each other by a thermosetting adhesive 21.

Each RFID element 23 has a built-in IC chip (not shown in the drawings) from and to which cable identifying information for identifying the cable from other cables can be read out and written in through transmission of electromagnetic energy, such as electromagnetic waves. This cable identifying information includes such items as the manufacturer, the date of production, the product name of the cable, the length of the cable, and details on the optical fiber ribbon 11 and the like. For this first embodiment, an electromagnetic induction method is used as the method for transmission of electromagnetic energy, however a microwave method or electromagnetic coupling method can be used. A RFID element 23 of this first embodiment is 2.1 mm in diameter and 12 mm long.

The RFID elements 23 are arranged along a longitudinal direction of the joining tapes 17 and 19 (a left-right direction in FIGS. 2 and 3) at equidistant intervals, in other words these RFID elements are arranged along a longitudinal direction of the cable core 3 (the direction perpendicular to the page in FIG. 1) at equidistant intervals. The interval between the RFID elements 23 when housed in the optical fiber cable 1 in a longitudinal direction of the cable should be set at approximately the maximum transmittable distance between a RFID element 23 and a read/write device (not shown in the drawings), e.g., the distance may be set at about 1 meter for electromagnetic energy transfer.

Figure 4:
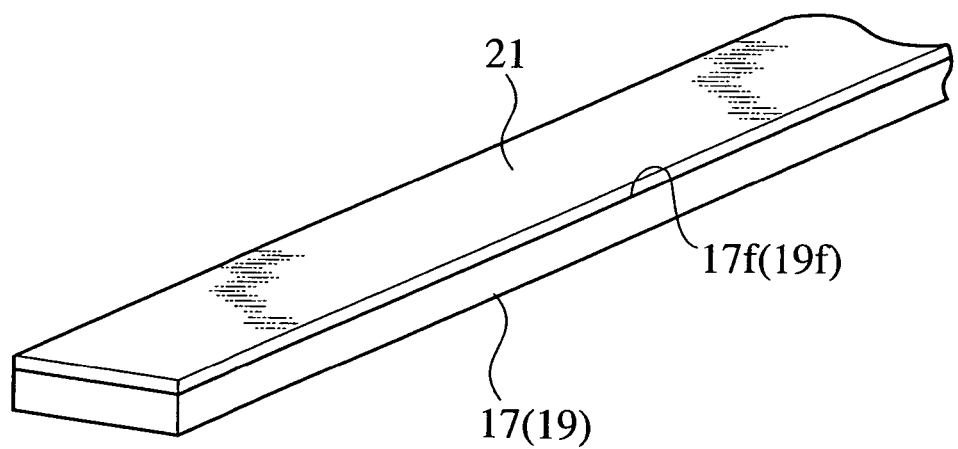
FIG. 4 is a perspective view of the joining tape composing the integrated member with a chain of RFIDs of the first exemplary embodiment.

FIG. 4 is a perspective view showing first joining tape 17 and the second joining tape 19. The first joining tape 17 has a first joining face 17f to which a thermosetting adhesive 21 can be applied. The second joining tape 19 has a second joining face 19f to which a thermosetting adhesive 21 can be applied. The first joining tape 17 and the second joining tape 19 are made of PET (polyethylene terephthalate). According to this first embodiment, the width of the first joining tape 17 and the second joining tape 19 is 6 mm, while the thickness of the first joining tape 17 and the second joining tape 19 is 0.1 mm (0.11 mm, in case of including the layer of thermosetting adhesive 21).

The first joining face 17f of the first joining tape 17 and the second joining face 19f of the second joining tape 19 are joined by adhesion in this embodiment, however these faces may be joined through heat sealing.

The integrated member with a chain of RFIDs 15 is positioned on the inside of the wrap 13 (see FIG. 1), however the integrated member with a chain of RFIDs 15 may be positioned on the outside of the wrap 13.

As shown in FIG. 1, a slot 27 is formed helically around the outside of the slotted core 5. In this slot 27 a transmission coaxial cable 29 for writing in cable identifying information to the RFID elements 23 is disposed along the inside of the integrated member with a chain of RFIDs 15.

Figure 5A:
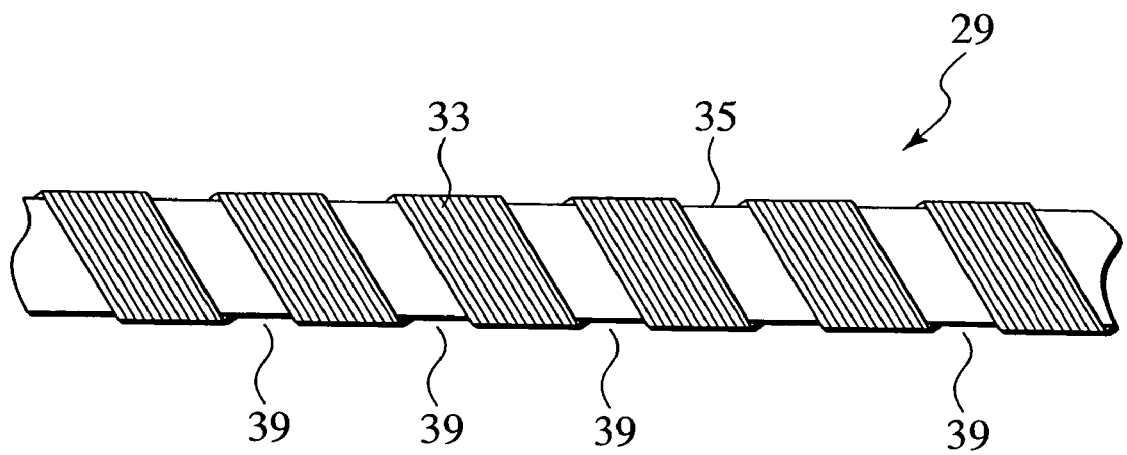
FIG. 5A is a side view of a transmission coaxial cable without the wrapping.
Figure 5B:
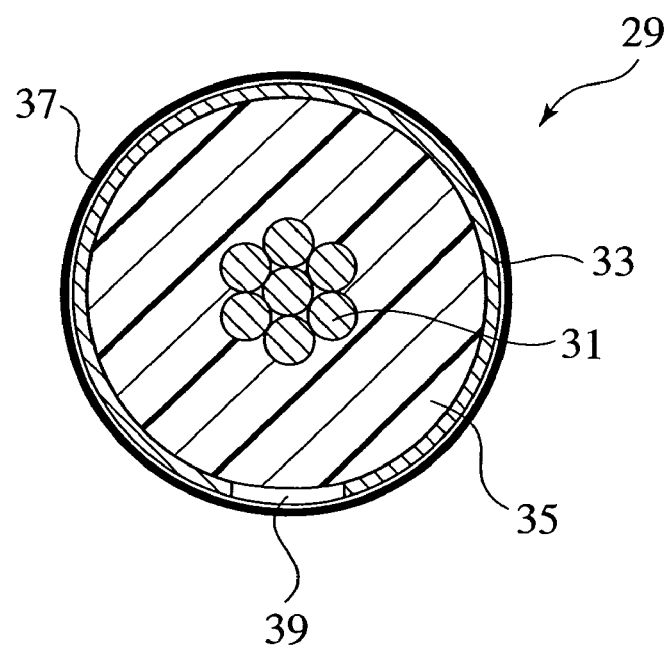
FIG. 5B is a cross-sectional view of the transmission coaxial cable.

FIG. 5A is a side view of the transmission coaxial cable 29. FIG. 5B is a cross-sectional view of the transmission coaxial cable 29. As shown in FIG. 5B, the transmission coaxial cable 29 includes an inner conductor 31 and an outer conductor 33 coaxially formed to the axis of the inner conductor 31 via an insulating layer 35. Around the outside of the outer conductor 33 a wrap 37 is provided. The outer conductor 33 includes a helically formed unshielded opening part (electromagnetic wave leak part) 39 for transmitting electromagnetic energy. This unshielded opening part 39 is formed by open helical wrapping of the outer conductor 33 around the outside of the insulating layer 35 maintaining regular intervals (see FIG. 5A). Each RFID element 23 is configured so as to be in proximity to an unshielded opening part 39.

Figure 6A:
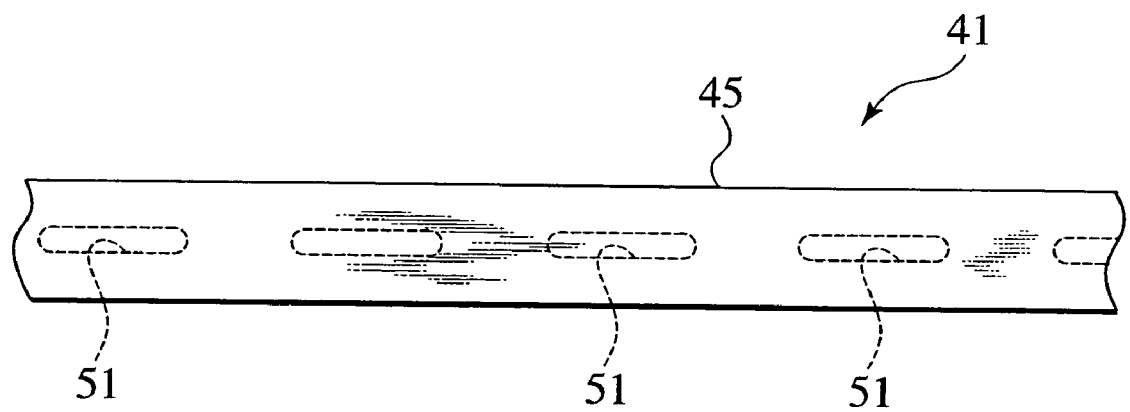
FIG. 6A is a side view showing a different form of transmission coaxial cable, here without a coaxial cable sheath.
Figure 6B:
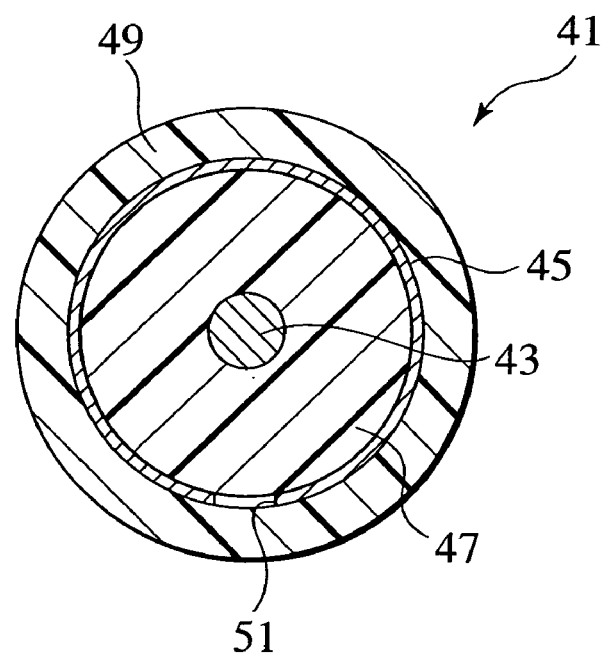
FIG. 6B is a cross-sectional view of the form of the transmission coaxial cable shown in FIG. 6A.

A different form of transmission coaxial cable 41 as shown in FIGS. 6A and 6B can be used instead of the transmission coaxial cable 29 as shown in FIGS. 5A and 5B. In the same manner as the transmission coaxial cable 29, this transmission coaxial cable 41 includes an inner conductor 43 and an outer conductor 45 coaxially arranged to the axis of the inner conductor 43 via an insulating layer 47. A coaxial cable sheath 49 is provided covering the outside of the outer conductor 45. A plurality of slit parts (unshielded opening parts) 51 for transferring electromagnetic energy are formed in this outer conductor 45 at equidistant intervals along the longitudinal direction of the cable, and each RFID element 23 is configured so as to be in proximity to the slit part 51 corresponding to the RFID element.

As shown in FIG. 1 a sheath 53 is provided covering the outside of the cable core 3 as well as the integrated member with a chain of RFIDs 15. This sheath 53 is made of PE (polyethylene) or PVC (polyvinyl chloride). According to this first embodiment the outside diameter of the sheath 53, i.e. the diameter of the optical fiber cable 1, is 22 mm.

On the surface of the sheath 53, a plurality of position indicators (not shown in the drawings) for indicating the positions of RFID elements 23 are formed at equidistant intervals along the longitudinal direction of the cable (the longitudinal direction of the cable core). The interval of these position indicators should be set to correspond to the interval of the plurality of RFID elements 23 when housed inside the optical fiber cable 1 in the longitudinal direction of the cable.

The operation of this first embodiment will now be described.

After the thermosetting adhesive 21 is applied to the second joining face 19f of the second joining tape 19 the plurality of RFID elements 23 are arranged on the second joining face 19f at equidistant intervals along the longitudinal direction of the tape. Next, after the thermosetting adhesive 21 is applied to the first joining face 17f of the first joining tape 17, the first joining face 17f and the second joining face 19f are overlapped each other. Using a heating roller or rollers (not shown in the drawings) the first joining face 17f and the second joining face 19f are adhered together such that they are joined, whilst the plurality of RFID elements 23 are kept in a condition sandwiched between the first joining tape 17 and the second joining tape 19. The integrated member with a chain of RFIDs 15 including an integrated body formed of a plurality of RFID elements 23 and joining tapes (the first joining tape 17 and the second joining tape 19) can be produced in this way.

After the integrated member with a chain of RFIDs 15 is produced, the integrated member with a chain of RFIDs 15 is arranged in the cable core 3 and the transmission coaxial cable 29 (or 41) is disposed in the slot 27 so as to be superimposed over and coincident with the inside of the integrated member with a chain of RFIDs 15. Then, the sheath 53 is disposed on the cable core 3. An optical fiber cable 1 accommodating therein the integrated member with a chain of RFIDs 15 and the transmission coaxial cable 29 (or 41) can be formed in this way. Here, the integrated member with a chain of RFIDs 15 includes a plurality of RFID elements 23 arranged at equidistant intervals along a longitudinal direction of the tape, enabling the plurality of RFID elements 23 to be accommodated inside the optical fiber cable 1 at equidistant intervals in a longitudinal direction of the cable.

By appropriate operation of the read/write device, cable identifying information can be written into the IC chip of each of the RFID elements 23 through transmission of electromagnetic energy and the cable identifying information thus written in can be read out from the appropriate IC chip of RFID element 23. This enables a specific optical fiber cable 1 to be identified amongst a plurality of cables laid for example in a multi-way conduit or duct.

Further, once cable identifying information is written in to any of the RFID elements 23 through transmission of electromagnetic energy to which is added a written-in signal, the electromagnetic energy is induced in the transmission coaxial cable 29 (or 41) via the unshielded opening part 39 (or a slit part 51 in proximity to any of the RFID elements 23) and transmitted on the transmission coaxial cable 29 (or 41). In this way, electromagnetic energy is induced at all the RFID elements 23 through the unshielded opening parts 39 (or all of the slit parts 51) enabling cable identifying information to be written in to all of the RFID elements 23 collectively.

As described, according to this first embodiment of this invention an integrated member with a chain of RFIDs 15 includes RFID elements 23 to and from which cable identifying information can be written in and read out by transmission of electromagnetic energy, therefore cable identifying information can be simply and speedily written in to the RFID elements 23 even where there is a large volume of cable identifying information for an optical fiber cable 1, moreover the cable identifying information can be simply and speedily read out from a RFID element 23. Thus, a particular optical fiber cable can be simply and speedily identified amongst a plurality of cables thereby enabling work involving such cables (such as work to replace existing cables or remove a cable) to be performed with a greater degree of efficiency.

Furthermore, for the reasons as described above, even after a substantial period of time has elapsed since an optical fiber cable 1 has been laid, the cable identifying information written into the RFID elements 23 will not become erased thereby enabling the optical fiber cable 1 to be identified for a long period of time.

Moreover, once cable identifying information is written in to any of the RFID elements 23 through transmission of electromagnetic energy to which is added a written-in signal, the electromagnetic energy is induced at all the RFID elements 23 through the unshielded opening parts 39 (or all of the slit parts 51) and the cable identifying information can be written in to all of the RFID elements 23 collectively, thereby enabling the work of writing in the cable identifying information to all of the RFID elements 23 to be performed simply and the RFID elements 23 to be used effectively.

Again, the integrated member with a chain of RFIDs 15 includes as one integrated body, a plurality of RFID elements 23 and the joining tapes 17 and 19, thus, arrangement of the integrated member with a chain of RFIDs 15 in the cable core enables a plurality of RFID elements 23 to be simply and easily accommodated inside the optical fiber cable 1 (on the inside of the sheath 27) and the optical fiber cable 1 can be reliably identified without positional displacement of a RFID element 23 inside the optical fiber cable 1.

Further, a plurality of RFID elements 23 can be accommodated at equidistant intervals in a longitudinal direction of the cable inside the optical fiber cable 1 and the interval between the RFID elements 23 when housed in the optical fiber cable 1 in the longitudinal direction of the cable is set at approximately the maximum transmittable distance between a RFID element 23 and the read/write device, therefore an optical fiber cable 1 can be identified in any region in which work is performed along the optical fiber cable 1.

Figure 7:
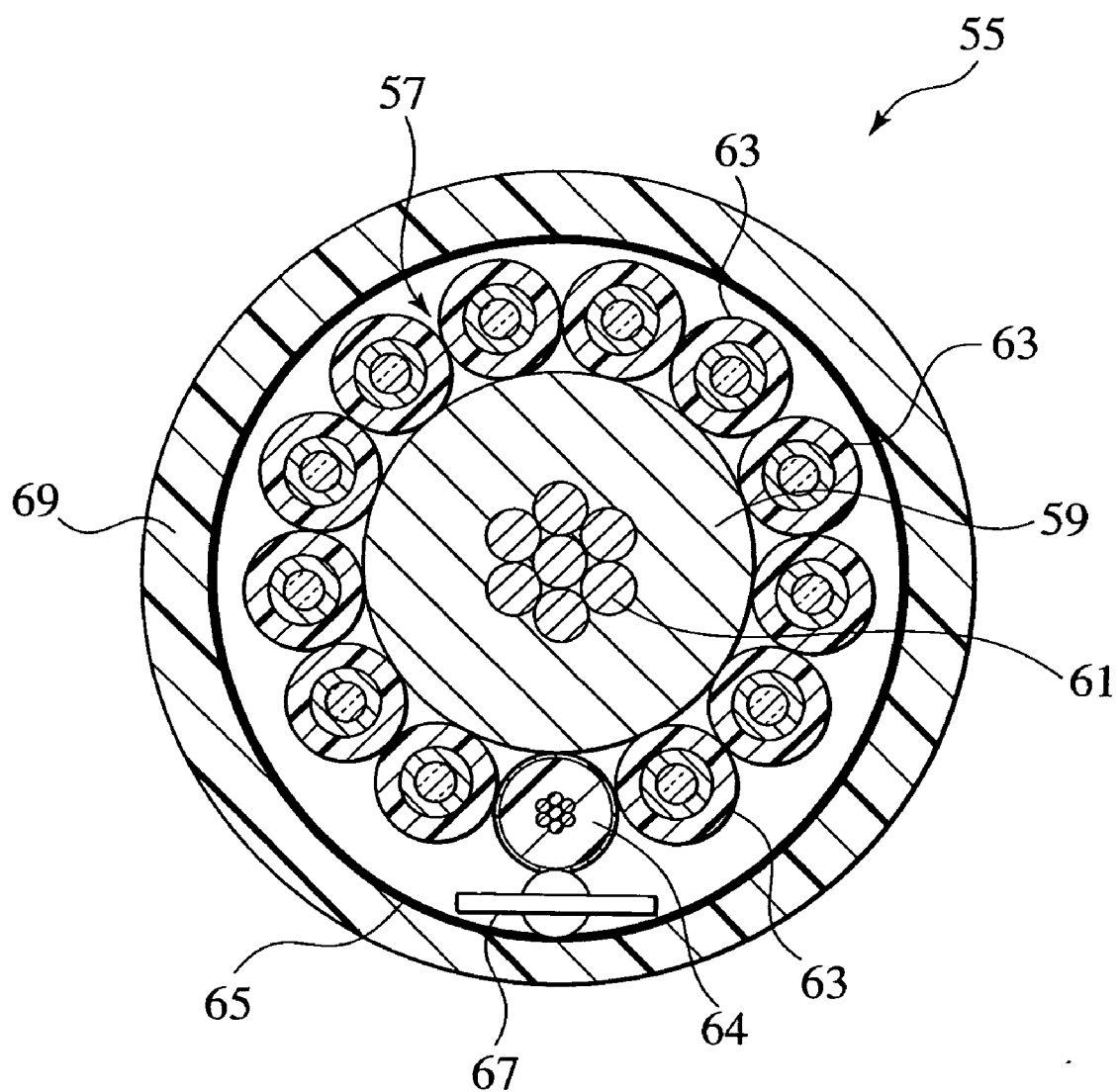
FIG. 7 is a cross-sectional view of an optical fiber cable according to a second exemplary embodiment of this invention.

FIG. 7 is a cross-sectional view of an optical fiber cable according to a second exemplary embodiment of this invention.

As shown in FIG. 7 a cable core 57 forms the major component of an optical fiber cable 55 according to the second embodiment of this invention. More specifically, this cable core 57 includes a central strength member 61 at the center of the cable core, consisting of seven stranded steel wires, covered with the central strength member sheath 59. Further, a plurality (12 according to this embodiment) of simplex optical cables 63 are collectively, tightly stranded around the outside of the strength member sheath 59. A wrap 65 is disposed around the outside of the plurality of simplex optical cables 63 and a transmission coaxial cable 64 for preventing the simplex optical cables 63 and the transmission coaxial cable 64 from loosening from the strength member sheath 59.

An integrated member with a chain of RFIDs 67 is disposed in the cable core 57. A detailed explanation of this integrated member with a chain of RFIDs 67 used for identifying the optical fiber cable 55 is omitted here as the structure is largely the same as that of the integrated member with a chain of RFIDs 15 according to the first embodiment (refer to FIGS. 2 and 3). The integrated member with a chain of RFIDs 67 is positioned to the inside of the wrap 65, however the integrated member with a chain of RFIDs 67 may be positioned to the outside of the wrap 65.

A sheath 69 is disposed covering around the outside of the cable core 57 as well as the integrated member with a chain of RFIDs 67. This sheath 69 is made of PE (polyethylene) or PVC (polyvinylchloride). According to this second embodiment the outside diameter of the sheath 69, that is to say the outside diameter of the optical fiber cable 55, is 20 mm.

On the surface of the sheath 69, a plurality of position indicators (not shown in the drawings) for indicating the positions of RFID elements 23 in the integrated member with a chain of RFIDs 67 are formed at equidistant intervals along a longitudinal direction of the cable (in FIG. 7, the direction perpendicular to the page). The interval between these position indicators should be set to correspond to the interval of the plurality of the RFID elements 23 when housed inside the optical fiber cable 55 in a longitudinal direction of the cable.

The operation and the effects of this second embodiment are the same as those of the first embodiment.

Figure 8:
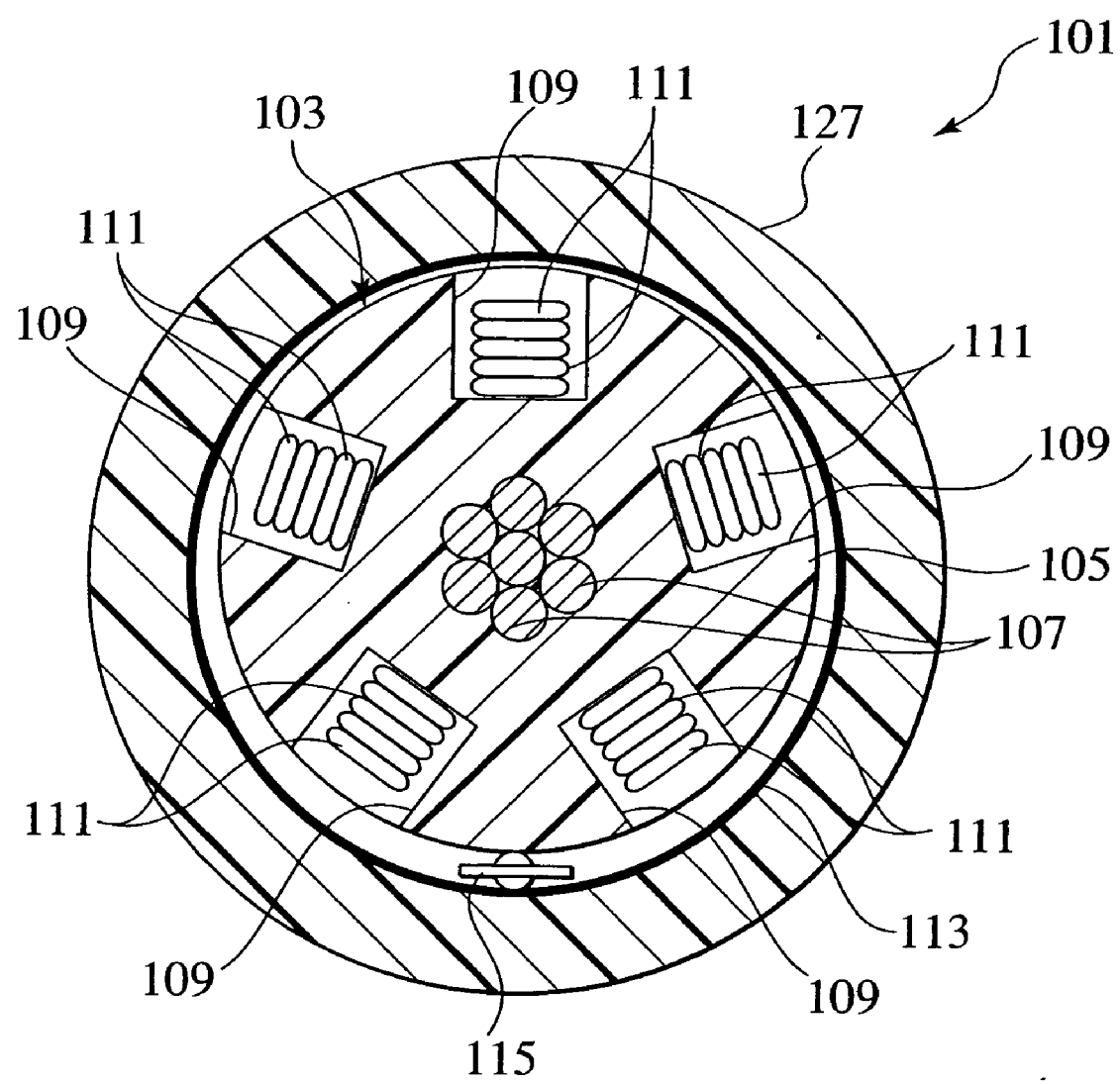
FIG. 8 is a cross-sectional view of an optical fiber cable according to a third exemplary embodiment of this invention.
Figure 9:
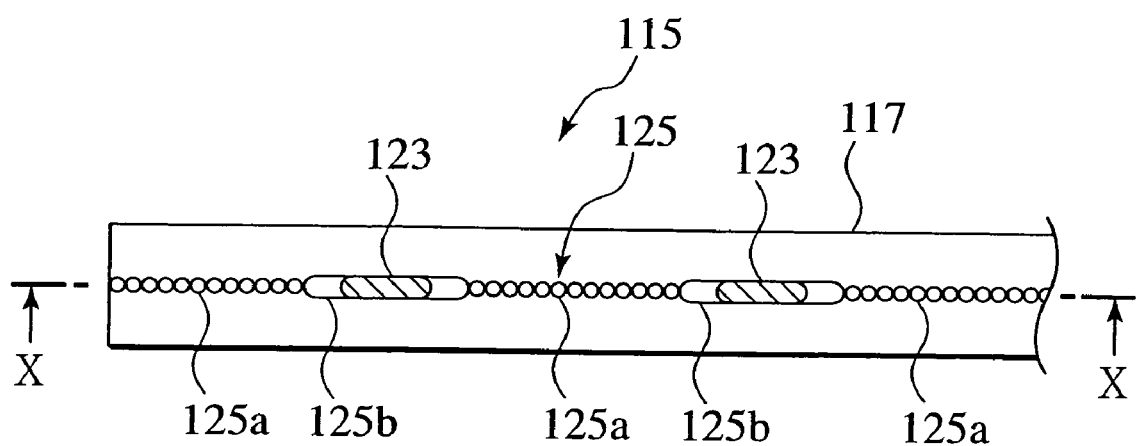
FIG. 9 is a plan view of the integrated member with a chain of RFIDs of the third exemplary embodiment of this invention.
Figure 10:
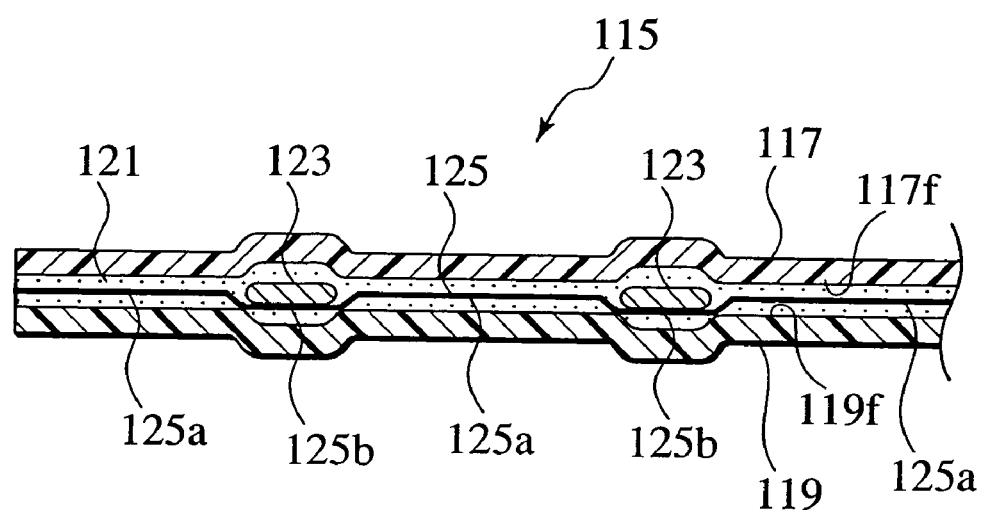
FIG. 10 is a cross-sectional view taken along the line X—X of FIG. 9.

FIG. 8 is a cross-sectional view of an optical fiber cable according to a third exemplary embodiment of this invention. FIG. 9 is a plan view of an integrated member with a chain of RFIDs of the third embodiment of this invention and FIG. 10 is a cross-sectional view taken along the line X—X of FIG. 9.

As shown in FIG. 8, a cable core 103 forms the major component of an optical fiber cable 101 according to a third embodiment of this invention. More specifically, this cable core 103 includes a slotted core 105 at the center of which is provided a central strength member 107 consisting of seven stranded steel wires. Further, a plurality (five, according to this embodiment) of slots 109 are formed in a helical formation around the outside of the slotted core 105. A plurality (five, according to this embodiment) of optical fiber ribbons 111 are layered and accommodated in each of the slots 109. Further, a wrap 113 is disposed around the outside of the slotted core 5, accommodating the optical fiber ribbons 111 remained inside the slots 109.

An integrated member with a chain of RFIDs 115 for identifying the optical fiber cable 101 is disposed in the cable core 103, laid longitudinally in or applied open helically around the slotted core 105. As shown in FIGS. 8 to 10, the integrated member with a chain of RFIDs 115 includes a first joining tape 117 and a second joining tape 119 and a plurality of RFIDs 123 sandwiched between the first joining tape 117 and the second joining tape 119. The first joining tape 117 and the second joining tape 119 are adhered to each other by a thermosetting adhesive 121.

Each RFID element 123 has a built-in IC chip (not shown in the drawings) from and to which cable identifying information for identifying the cable from other cables can be read out and written in through transmission of electromagnetic energy such as electromagnetic waves. This cable identifying information includes such items as the manufacturer, the date of production, the product name of the cable, the length of the cable, and details on the optical fiber ribbon 111 and the like. For this third embodiment, an electromagnetic induction method is used as the method for the transmission of electromagnetic energy however a microwave method or electromagnetic coupling method can be used. A RFID element 123 according to this third embodiment is 2.1 mm in diameter and 12 mm long.

The RFID elements 123 are arranged in a longitudinal direction of the joining tapes 117 and 119 (in a left-right direction in FIGS. 9 and 10) at equidistant intervals. The interval between the RFID elements when housed in the optical fiber cable 101 in a longitudinal direction of the cable (in FIG. 8, the direction perpendicular to the page) should be set at approximately the maximum transmittable distance between a RFID element 123 and a read/write device (not shown in the drawings), the range is about 1 m for electromagnetic induction method.

The first joining tape 117 and the second joining tape 119 are the same as the first joining tape 17 and the second joining tape 19 according to the first embodiment, i.e. these are made of PET (polyethylene terephthalate). The first joining tape 117 has a first joining face 117f to which a thermosetting adhesive 121 can be applied. The second joining tape 119 has a second joining face 119f to which a thermosetting adhesive 121 can be applied. According to this third embodiment, the width of the first joining tape 117 and the second joining tape 119 is 6 mm, while the thickness of the first joining tape 117 and the second joining tape 119 is 0.1 mm (0.11 mm, in case of including the layer of thermosetting adhesive 121).

Further, a pair of transmission wires 125 are arranged extending in a longitudinal direction of the tapes, between the first joining tape 117 and the second joining tape 119. This pair of transmission wires 125 consist of two insulated conducting wires. This pair of transmission wires 125 provide a plurality of twisted parts 125a formed by the twisting of the two conducting wires and a plurality of loop parts 125b formed by each of the two conducting wires and that are in contact with their respective corresponding RFID elements 123.

The relationship between the arrangement of the RFID elements 123 and the pair of transmission wires 125 is shown clearly in FIG. 9, where the RFID elements 123 and the pair of transmission wires 125 are each indicated by solid lines.

The first joining face 117f of the first joining tape 117 and the second joining face 119f of the second joining tape 119 are joined by adhesion and here, however these faces may be joined through heat sealing.

The integrated member with a chain of RFIDs 115 is positioned to the inside of the wrap 113 (see FIG. 8), however the integrated member with a chain of RFIDs 115 may be positioned to the outer side of the wrap 113.

As shown in FIG. 8 a sheath 127 is provided covering around the outside of the cable core 103 as well as the integrated member with a chain of RFIDs 115. This sheath 127 is made of PE (polyethylene) or PVC (polyvinylchloride). According to this third embodiment the outside diameter of the sheath 127, i.e. the outside diameter of the optical fiber cable 101, is 18 mm.

On the surface of the sheath 127, a plurality of position indicators (not shown in the drawings) for indicating the positions of the RFID elements 123 are placed at equidistant intervals along a longitudinal direction of the cable. The interval of these position indicators should be set to correspond to the interval of the RFID elements 123 when housed inside the optical fiber cable 101 in a longitudinal direction of the cable.

The operation of this third embodiment will now be described.

After the thermosetting adhesive 121 is applied to the second joining face 119f of the second joining tape 119, the plurality of RFID elements 123 are arranged on the second joining face 119f at equidistant intervals along a longitudinal direction of the tape. Further, the pair of transmission wires 125 are arranged on the second joining face 119f such that each loop part 125b is in contact with the RFID element 123 corresponding thereto. Next, after the thermosetting adhesive 121 is applied to the first joining face 117f of the first joining tape 117, the first joining face 117f and the second joining face 119f are overlapped each other. Using a heating roller or rollers (not shown in the drawings) the first joining face 117f and the second joining face 119f are adhered together such that they are joined, whilst the plurality of RFID elements 123 are kept in a condition sandwiched between the first joining tape 117 and the second joining tape 119. The integrated member with a chain of RFIDs 115 including an integrated body formed of a plurality of RFID elements 123 and joining tapes (the first joining tape 117 and the second joining tape 119) can be produced in this way.

After the integrated member with a chain of RFIDs 115 is produced, the integrated member with a chain of RFIDs 115 is disposed on the cable core 103, laid longitudinally in or applied open helically around the slotted core 105 and the sheath 127 is provided around the cable core 103. An optical fiber cable 101 housing an integrated member with a chain of RFIDs 115 can be produced in this way. Here, the integrated member with a chain of RFIDs 115 provides a plurality of RFID elements 123 arranged at equidistant intervals in a longitudinal direction of the tapes, accordingly, this enables a plurality of RFID elements 123 to be housed in the optical fiber cable 101 at equidistant intervals, along a longitudinal direction of the cable.

The cable 101 according to this invention being of the above described, by appropriate operation of the read/write device, cable identifying information can be written into the IC chip of each RFID element 123 through transmission of electromagnetic energy and the cable identifying information thus written in can be read out from the appropriate IC chip. This enables the specific optical fiber cable 101 to be identified amongst a plurality of cables laid for example in a multi-way conduit or duct.

Further, once cable identifying information is written in to any of the RFID elements 123 through transmission of electromagnetic energy to which is added a written-in signal, the electromagnetic energy is induced in the pair of transmission wires 125 via the loop part 125b corresponding to that RFID element 123 and transmitted by the pair of transmission wires 125. In this way, electromagnetic energy is induced in all of the loop parts 125b enabling cable identifying information to be written in to all of the RFID elements 123 collectively.

As described, according to this third embodiment of this invention the integrated member with a chain of RFIDs 115 includes RFID elements 123 to and from which cable identifying information can be written in and read out by transmission of electromagnetic energy, therefore cable identifying information can be simply and speedily written in to the RFID elements 123 even where there is a large volume of cable identifying information for an optical fiber cable 101, moreover the cable identifying information can be simply and speedily read out from a RFID element 123. Thus, a particular optical fiber cable can be simply and speedily identified amongst a plurality of cables thereby enabling work involving such cables (such as work to replace existing cables or remove a cable) to be performed with a greater degree of efficiency.

Furthermore, for the reasons as described above, even after a substantial period of time has elapsed since an optical fiber cable 101 has been laid, the cable identifying information written into the RFID elements 123 will not become erased thereby enabling the optical fiber cable 101 to be identified for a long period of time.

Moreover, once cable identifying information is written in to any of the RFID elements 123 through transmission of electromagnetic energy to which is added a written-in signal, the electromagnetic energy is induced in all of the loop parts 125b and the cable identifying information can be written in to all of the RFID elements 123 collectively thereby enabling the work of writing in the cable identifying information to all of the RFID elements 123 to be performed simply and the RFID elements 123 to be used effectively.

Again, the integrated member with a chain of RFIDs 115 includes as one integrated body, a plurality of RFID elements 123 and the joining tapes 117 and 119, thus, arrangement of the integrated member with a chain of RFIDs 115 in the cable core 103 by laying the integrated member with a chain of RFIDs 115 longitudinally therein or applying the integrated member with a chain of RFIDs 115 open helically around the cable core 103 enables a plurality of RFID elements 123 to be simply and easily accommodated inside the optical fiber cable 101 (on the inward facing side of the sheath 127) and the optical fiber cable 101 can be reliably identified without positional displacement of a RFID element 123 inside the optical fiber cable 101.

Further, a plurality of RFID elements 123 can be accommodated inside the optical fiber cable 101 at equidistant intervals in a longitudinal direction of the cable and the interval between the RFID elements 123 when housed in the optical fiber cable 101 in the longitudinal direction of the cable is set at approximately the maximum transmittable distance between a RFID element 123 and the read/write device, therefore an optical fiber cable 101 can be identified in any region in which work is performed along the optical fiber cable 101.

Figure 11:
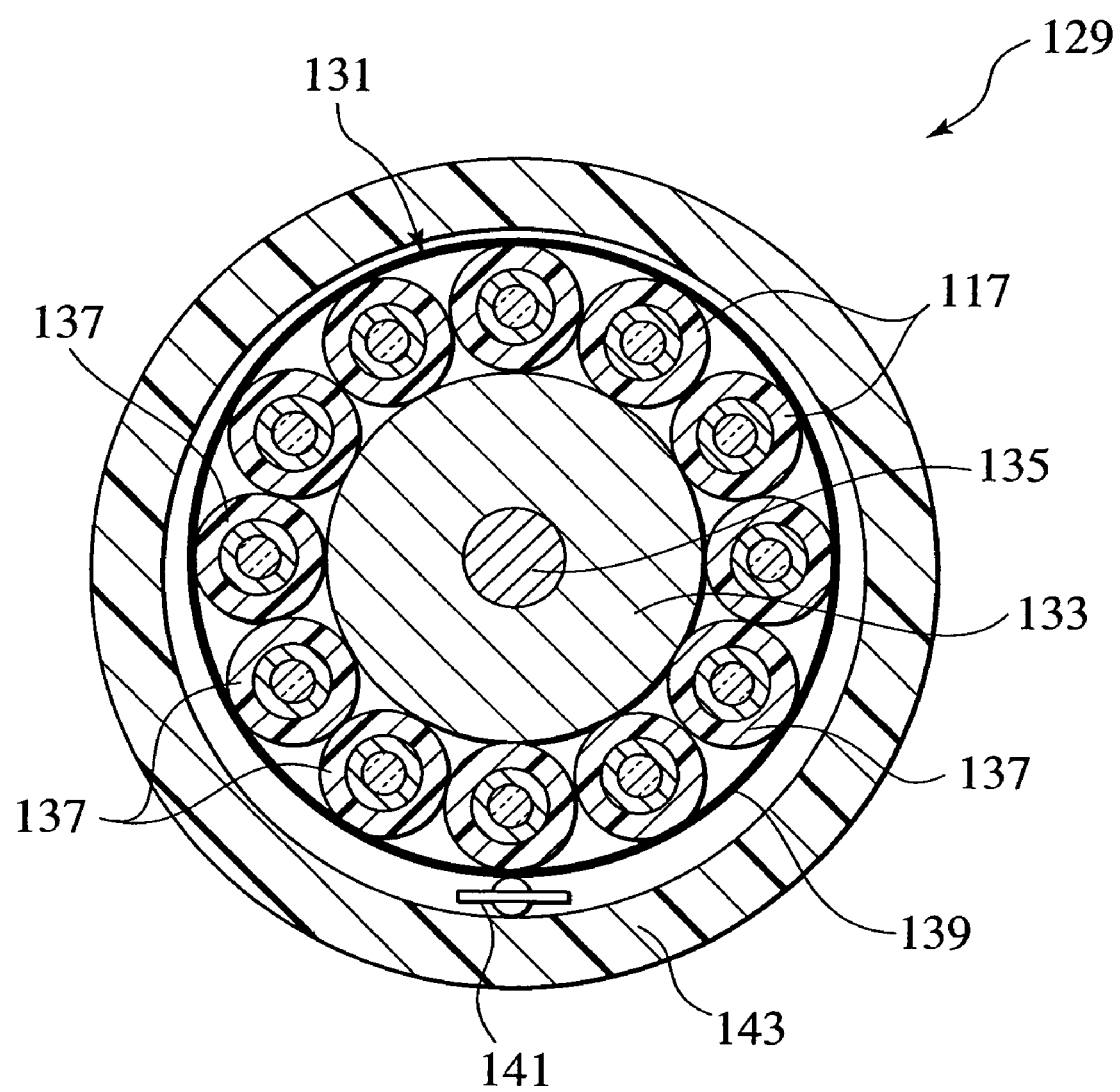
FIG. 11 is a cross-sectional view of an optical fiber cable according to a fourth exemplary embodiment of this invention.

FIG. 11 is a cross-sectional view of an optical fiber cable according to a fourth exemplary embodiment of this invention.

As shown in FIG. 11 a cable core 131 forms the major component of an optical fiber cable 129 according to the fourth embodiment of this invention. More specifically, this cable core 131 includes a central strength member 135 at the center which is covered with a central strength member sheath 133. Further, a plurality (12 according to this embodiment) of simplex optical cables 137 are collectively, tightly stranded around the outside of the central strength member sheath 133. A wrap 139 is disposed around the outside of the plurality of simplex optical cables 137 preventing the simplex optical cables 137 from loosening from the central strength member sheath 133.

The integrated member with a chain of RFIDs 141 for identifying the optical fiber cable 129 is disposed as a single body in or on the cable core 131 by laying the integrated member with a chain of RFIDs 141 longitudinally therein or applying the integrated member with a chain of RFIDs 141 open helically around the cable core 131. A detailed explanation of this integrated member with a chain of RFIDs 141 is omitted here as the structure is largely the same as that of the integrated member with a chain of RFIDs 115 according to the third embodiment (refer to FIG. 9). The integrated member with a chain of RFIDs 141 is positioned to the outer side of the wrap 139, however the integrated member with a chain of RFIDs 141 may be positioned to the inside of the wrap 139.

A sheath 143 is provided covering around the outside of the cable core 131 as well as the integrated member with a chain of RFIDs 141. This sheath 143 is made of PE (polyethylene) or PVC (polyvinylchloride). According to this fourth embodiment the diameter of the sheath 143, i.e. the diameter of the optical fiber cable 129 is 16 mm.

On the surface of the sheath 143, a plurality of position indicators (not shown in the drawings) for indicating the positions of RFID elements 123 in the integrated member with a chain of RFIDs 141 are formed at equidistant intervals along a longitudinal direction of the cable (in FIG. 11, the direction perpendicular to the page). The interval between these position indicators should be set to correspond to the interval of RFID elements 123 when housed inside the optical fiber cable 129 in a longitudinal direction of the cable.

The operation and the effects of this fourth embodiment are the same as those of the third embodiment.

The above described embodiments of a cable according to this invention have the following features.

(1) The cable (1, 55) comprises: a cable core (3, 57); a plurality of RFID elements (23), arranged in the cable core at suitable intervals along a longitudinal direction of the cable core, to and from which cable identifying information for identifying the cable from other cables can be written in and read out by electromagnetic energy; a transmission coaxial cable (29, 41) disposed in the cable core so as to be superimposed over and coincident with the plurality of RFID elements, this transmission coaxial cable including an inner conductor (31, 43) and an outer conductor (33, 45) arranged coaxially via an insulating layer (35, 47); and a sheath (53) disposed on the cable core, that covers the outside of the cable core as well as the plurality of RFID elements and the transmission coaxial cable, wherein the outer conductor of the transmission coaxial cable has unshielded opening parts (39, 51) for transferring electromagnetic energy and each RFID element is arranged in proximity to each of the unshielded opening parts.

(2) The cable (1, 55) comprises: a cable core (3, 57); an integrated member with a chain of RFIDs (15, 67) disposed in the cable core, this integrated member with a chain of RFIDs including a plurality of RFID elements (23) arranged in the integrated member with a chain of RFIDs at suitable intervals along a longitudinal direction of the cable core, to and from which cable identifying information for identifying the cable from other cables can be written in and read out by electromagnetic energy; a transmission coaxial cable (29, 41) disposed in the cable core so as to be superimposed over and coincident with the integrated member with a chain of RFIDs, this transmission coaxial cable including an inner conductor (31, 43) and an outer conductor (33, 45) arranged coaxially via an insulating layer (35, 47); and a sheath (53) disposed on the cable core, that covers the outside of the cable core as well as the integrated member with a chain of RFIDs and the transmission coaxial cable, wherein the outer conductor of the transmission coaxial cable has unshielded opening parts (39, 51) for transferring electromagnetic energy and each RFID element is arranged so as to be in proximity to each of the unshielded opening parts.

(3) The integrated member with a chain of RFIDs includes a first joining tape (17) having a first joining face (17f) and a second joining tape (19) having a second joining face (19f) either adhering to or fused to the first joining face so as to sandwich the plurality of RFID elements between the first joining tape and the second joining tape.

(4) The plurality of RFID elements are arranged at equidistant intervals and the unshielded opening part (39) is formed by applying the outer conductor open helically around the outside of the insulating layer maintaining predetermined intervals.

(5) The plurality of RFID elements are arranged at equidistant intervals and the unshielded opening parts (51) are formed of a plurality of slits parts formed in the outer conductor at equidistant intervals along the longitudinal direction of the cable core.

(6) The cable (101, 129) is provided comprising: a cable core (103, 131); a plurality of RFID elements (123) arranged in the cable core at suitable intervals along a longitudinal direction of the cable, to and from which cable identifying information for identifying the cable from other cables can be written in and read out by transmission of electromagnetic energy; a pair of transmission wires (125) having two conducting wires, this pair transmission wires being disposed along the direction in which the plurality of RFID elements are arranged in the cable core; and a sheath (127, 143) disposed on the cable core, that covers the outside of the cable core as well as the plurality of RFID elements and the pair of transmission wires, wherein the pair of transmission wires include a plurality of twisted parts (125a) formed by the twisting of the two conducting wires and a plurality of loop parts (125b) each formed by the two conducting wires and that are either in contact with or in proximity to their respective corresponding RFID elements, and wherein the twisted parts and the loop parts are formed alternately along a longitudinal direction of the cable.

(7) The cable (101, 129) is provided comprising a cable core (103, 131); an integrated member with a chain of RFIDs (115, 141) disposed on the cable core laid longitudinally or applied open helically around the cable core, this integrated member with a chain of RFIDs including a first joining tape (117) having a first joining face (117f), a second joining tape (119) having a second joining face (119f) either adhering to or fused to the first joining face, a plurality of RFID elements (123) arranged between the first joining tape and the second joining tape at suitable intervals along a longitudinal direction of the tapes, to and from which cable identifying information for identifying the cable from other cables can be written in and read out by transmission of electromagnetic energy, and a pair of transmission wires (125) including two conducting wires and that is arranged between the first joining tape and the second joining tape; and a sheath (127, 143) disposed on the cable core, that covers the outside of the cable core as well as the integrated member with a chain of RFIDs, wherein the pair of transmission wires include a plurality of twisted parts (125a) formed by the twisting of the two conducting wires and a plurality of loop parts (125b) each formed by the two conducting wires and that are in contact with their respective corresponding RFID elements, and wherein the twisted parts and the loop parts are formed alternately along a longitudinal direction of the cable.

(8) The integrated member with a chain of RFIDs (115, 141) used for identifying a cable comprises: a first joining tape (117) having a first joining face (117f); a second joining tape (119) having a second joining face (119f) either adhering to or fused to the first joining face; a plurality of RFID elements (123) arranged between the first joining tape and the second joining tape at suitable intervals in a longitudinal direction of the tapes, to and from which cable identifying information for identifying the cable from other cables can be written in and read out by transmission of electromagnetic energy; and a pair of transmission wires (125) including two conducting wires and that is arranged between the first joining tape and the second joining tape, wherein the pair of transmission wires include a plurality of twisted parts (125a) formed by the twisting of the two conducting wires and a plurality of loop parts (125b) each formed by the two conducting wires and that are in contact with their respective corresponding RFID elements, and wherein the twisted parts and the loop parts are formed alternately along a longitudinal direction of the tapes.

The above described embodiments of a cable according to this invention provide the following effects.

(1) Even when there is a substantial volume of cable identifying information for a cable, all of that cable identifying information can be simply and speedily written-in to RFID elements.

(2) All cable identifying information can be simply and speedily read-out from any RFID element.

(3) A particular cable can be simply and speedily identified among a plurality of cables, thereby enabling work involving such cables (such as work to replace existing cables or remove a cable) to be performed more efficiently.

(4) Even after a substantial period of time has elapsed since an optical fiber cable has been laid, the cable identifying information written into the RFID elements therein will not become erased thereby enabling the optical fiber cable to be identified for a long period of time.

(5) The work of writing in cable identifying information to all RFID elements can be performed simply and the RFID elements can be used effectively.

(6) A cable can be identified in any transmittable region along the cable in which work is performed.

(7) A plurality of RFID elements can be easily and simply accommodated in a cable (on the inside of a sheath of the cable).

(8) A cable can be reliably identified assuring a constant interval of RFID elements 23 inside the optical fiber cable.

The above description of this invention is illustrative and not restrictive and the invention can be exercised with various modifications in form without departing from the spirit and scope of this invention as defined by the appended claims. For example, the plurality of RFID elements 23 (or 123) may be housed within the optical fiber cable 1 (55, 101,129) without themselves being integrated into one body.

In the case of the third and fourth embodiments, each loop part 125*b* may be arranged in proximity to, but not always in actual contact with the respective RFID element 123 corresponding thereto. Further, the integrated member with a chain of RFIDs 15 (67,115,141) may be used for metal cable instead of optical fiber cable 1 (55,101,129).

What is claimed is:

1. A cable comprising:
   a cable core;
   a plurality of radio frequency identification elements; and
   a sheath covering the cable core and the radio frequency identification elements.

2. The cable according to claim 1, wherein the plurality of radio frequency identification elements are arranged in the cable core.

3. The cable according to claim 1, wherein the plurality of radio frequency identification elements are arranged adjacent to the cable core.

4. The cable according to claim 1, wherein the plurality of radio frequency identification elements are arranged at suitable intervals along a longitudinal direction of the cable core.

5. The cable according to claim 1, wherein the plurality of radio frequency identification elements store identifying information for the cable.

6. The cable according to claim 5, wherein the identifying information can be written in and read out by electromagnetic energy.

7. The cable according to claim 1, further comprising a transmission coaxial cable arranged adjacently along the plurality of radio frequency identification elements.

8. The cable according to claim 7, wherein the transmission coaxial cable is arranged in a slot of the cable core.

9. The cable according to claim 7, wherein the transmission coaxial cable is arranged adjacent to simplex optical cables.

10. The cable according to claim 7, wherein the transmission coaxial cable is superimposed over and coincident with the plurality of radio frequency identification elements.

11. The cable according to claim 7, wherein the transmission coaxial cable comprises an inner conductor and an outer conductor arranged coaxially via an interposed insulating layer.

12. The cable according to claim 11, wherein:
    the outer conductor of the transmission coaxial cable has unshielded opening parts for transferring electromagnetic energy; and
    each of the radio frequency identification elements is arranged in proximity to each of the unshielded opening parts.

13. The cable according to claim 12, wherein the unshielded opening parts are formed by applying open helically the outer conductor around the outside of the insulating layer maintaining predetermined intervals.

14. The cable according to claim 12, wherein the unshielded opening parts are formed of a plurality of slit parts formed in the outer conductor at equidistant intervals along the longitudinal direction of said cable core.

15. The cable according to claim 1, further comprising:
    an integrated member containing the plurality of radio frequency identification elements in a chain.

16. The cable according to claim 15, wherein the integrated member with the chain of radio frequency identification elements comprises a first joining tape having a first joining face and a second joining tape having a second joining face connected to the first joining face so as to sandwich the plurality of radio frequency identification elements between the first joining tape and the second joining tape.

17. The cable according to claim 16, wherein the first and second joining faces are adhered together.

18. The cable according to claim 16, wherein the first and second joining faces are fused together.

19. The cable according to claim 1, wherein the radio frequency identification elements are arranged equidistantly from one another.

20. The cable according to claim 19, wherein the distance between radio frequency identification elements is approximately equal to the maximum transmittable distance between a radio frequency identification element and a read/write device.

21. The cable according to claim 19, wherein the plurality of radio frequency identification elements are arranged helically around the cable core.

22. The cable according to claim 19, wherein the plurality of radio frequency identification elements are arranged longitudinally along the cable core.

23. The cable according to claim 1, further comprising a pair of transmission wires arranged in proximity to the plurality of radio frequency identification elements.

24. The cable according to claim 23, wherein the pair of transmission wires are connected to the plurality of radio frequency identification elements.

25. The cable according to claim 24, further comprising an integrated member containing the plurality of radio frequency identification elements and transmission wires in a chain,
    wherein the integrated member comprises a first joining tape having a first joining face and a second joining tape having a second joining face connected to the first joining face so as to sandwich the plurality of radio frequency identification elements and the pair of transmission wires between said first joining tape and said second joining tape.

26. The cable according to claim 23, wherein the pair of transmission wires comprise:
    a plurality of twisted parts formed by the twisting of the two conducting wires; and
    a plurality of loop parts each formed by the two conducting wires to be adjacent to respective ones of the plurality of radio frequency identification elements.

27. The cable according to claim 26, wherein the twisted parts and the loop parts are formed alternately along the longitudinal direction of said cable.

28. An integrated member with a chain of RFIDs used for identifying a cable comprising:
    a first joining tape having a first joining face;
    a second joining tape having a second joining face connected to the first joining face;
    a plurality of radio frequency identification elements arranged between said first joining tape and said second joining tape at suitable intervals along a longitudinal direction of the tapes; and
    a pair of transmission wires including two conducting wires arranged between the first joining tape and the second joining tape.

29. An integrated member according to claim 28, wherein the plurality of radio frequency identification elements hold cable identifying information for identifying the cable from another cable which can be written in and read out by transmission of electromagnetic energy.

30. An integrated member according to claim 28, wherein the pair of transmission wires comprise:

a plurality of twisted parts formed by the twisting of the two conducting wires; and a plurality of loop parts each formed by the two conducting wires to be adjacent to respective ones of the plurality of radio frequency identification elements.

31. An integrated member according to claim 30, wherein the twisted parts and the loop parts are formed alternately along a longitudinal direction of the tapes.

* * * * *